Figure 1:
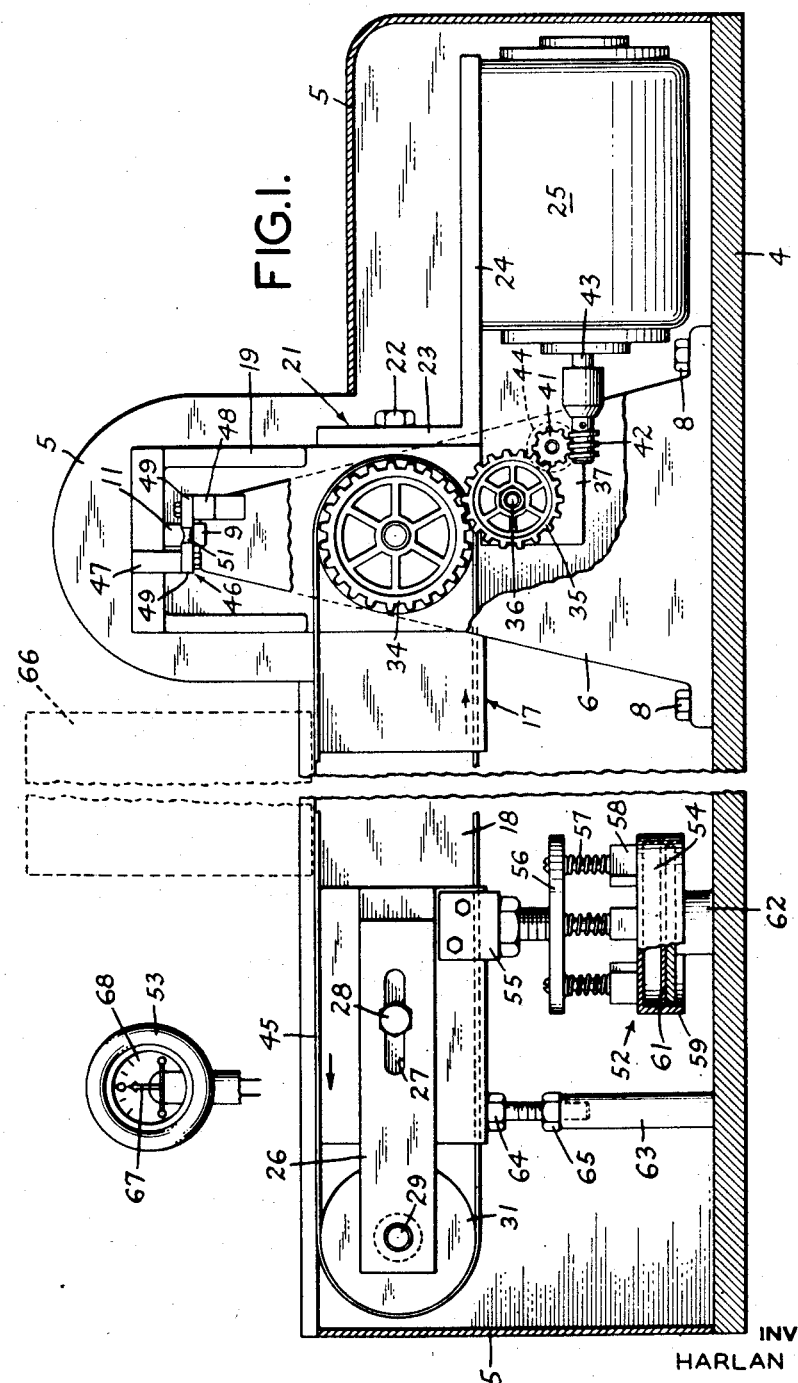

Dec. 31, 1957 H. A. HADLEY 2,818,245
WEIGHING SCALES

Filed Jan. 14, 1952 2 Sheets-Sheet 2

INVENTOR.
HARLAN A. HADLEY
BY
ATTORNEY.

United States Patent Office 2,818,245
Patented Dec. 31, 1957

2,818,245

WEIGHING SCALES

Harlan A. Hadley, Burlington, Vt., assignor, by mesne assignments, to Toledo Scale Company, Toledo, Ohio, a corporation of New Jersey Application January 14, 1952, Serial No. 266,260

8 Claims. (Cl. 265—27)

My invention relates to weighing scales, and relates more particularly to weighing devices for detecting underweight or over-weight articles or packages.

Many commodities are packaged or wrapped in automatic machines. Thus, such a machine may automatically weigh out a predetermined quantity of a commodity such as cereal, coffee, or other food product, discharge the same into a container and seal the latter. Another such type of machine may cut a bar of butter to a size representing a definite weight and wrap the same. It is an object of the present invention to provide a simple and expeditious weighing device which may be placed in juxtaposition to a packaging machine to receive the packages or wrapped articles therefrom and to weigh the same for the purpose of detecting whether they are underweight or overweight, as well as giving an indication as to whether they are of the proper weight.

Another object of my invention is the provision of a package weighing device which is portable and may be readily moved from one packaging machine to another, or to a point where the packages or articles to be weighed thereon may be fed thereto manually.

Still another object of my invention is the provision of a weighing device which moves the packages or articles as they are being weighed.

A further object of my invention is to provide a weighing device which is capable of moving the packages or articles being weighed at any predetermined speed, e. g. in accordance with the rate at which the packages or wrapped articles are discharged from the packaging machines and fed to the weighing device.

A still further object of my invention is the provision in a weighing device of a continuously movable load platform for continuously moving the objects being weighed and while they are being weighed.

Another object of my invention is to provide a weighing device for continuously weighing packages or articles being fed thereto at any desired rate wherein the object being weighed travels on a continuously moving endless belt.

Yet another object of my invention is to provide a weighing device wherein the continuously movable endless belt employed as the load platform has operatively connected thereto electrical means for indicating the weight of the object being weighed relative to a reference weight.

Other objects of this invention, together with certain details of construction and combinations of parts, will appear from the following detailed description and will be pointed out in the appended claims.

The weighing device of my invention comprises a package conveying means such as an endless belt trained over an idler roller and a driven roller, which rollers are rotatably carried on one end of a suitable framework. The other end of the framework supports a motor for driving through suitable gearing the driven roller, thus driving the endless belt. The framework functions as a main lever of a weighing scale and to this end is provided with knife edge pivots which are supported on bearing members on fulcrum stands. Attached to the framework is an electrical device which cooperates with an indicator for registering a weight indication.

The weighing device of my invention may be portable or may be permanently mounted in desired position. Moreover, the articles to be weighed may be fed thereto by hand, or the weighing device may be moved into juxtaposition to any packaging machine and the packages fed directly therefrom onto the endless belt of my weighing device. After the articles are weighed, they may be removed from the endless belt manually, or a conveyor may be placed in juxtaposition to the discharge end of the weighing device for receiving from the endless belt the weighed articles. Means may also be provided at the discharge end of the weighing device, operated by the weight indicating means, for example, for selectively delivering the weighed articles to a plurality of stations in accordance with the individual weight of the articles.

The indicating means operatively connected to the weighing mechanism may be electrical or mechanical and may be arranged to operate a light or sound system to give a visual or audible indication of the relative weight of the article being weighed. The indicating means may also be designed to operate a gate system for selectively directing the weighed articles to a plurality of stations depending upon the weight thereof.

Figure 2:
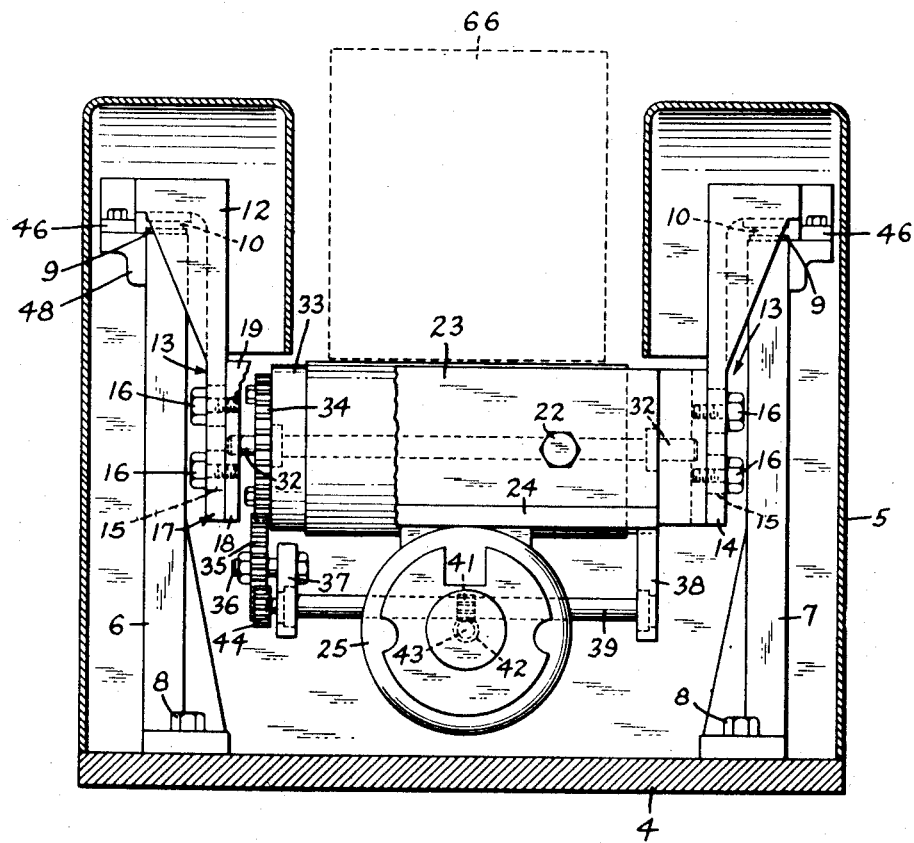

The weighing device of my invention will now be described in greater detail with reference to the accompanying drawings wherein:

Fig. 1 is a side elevational view of the weighing device, with parts broken away to show details thereof, and Fig. 2 is an elevational view of the feed end thereof.

Like reference numerals indicate like parts throughout both views of the drawings.

In the drawings, the reference numeral 4 indicates a base plate on which certain scale elements of the weighing device are mounted, and reference numeral 5 indicates a housing structure for covering the scale elements, but leaving the endless belt exposed.

On base plate 4 are fixed two fulcrum stands 6 and 7, as by means of screw bolts 8. The upper extremities of the fulcrum stands may be machined to the same flat, horizontal plane, or they may be provided with a recess the seats of which may be machined to the same flat, horizontal plane. In either case, there is cemented to each of the fulcrum stands an agate or other suitable hard material, which has been ground optically flat on its operative surface, to form a bearing member 9 for the knife edge fulcrum pivots, generally indicated by reference numeral 10.

The pivots 10 are mounted in bosses 11 integral with the short, or horizontal, end 12 of angular supports 13. The lower ends 14 of the long, or vertical, portion of supports 13 are provided with slots 15. Screw bolts 16 pass through slots 15 and are threaded into the framework, generally indicated by reference numeral 17, for attaching said framework to the supports 13. In this manner, the framework is pivotally supported on the fulcrum stands 6 and 7, and may be adjustable relative thereto.

The framework 17 comprises a pair of horizontal extending members 18, which members are connected at one end by a cross-piece or plate of solid material 19, and an angular member 21 which is attached, as by bolts 22, to the plate 19. The angular member comprises a vertical portion 23 and a horizontal portion 24 which may function as a weight receiving platform and also as a support for a motor 25, the function of which will be described hereinafter. At the free end of each of the horizontally extending members 18 is adjustably mounted a bracket 26 provided with a slot 27, which is held in adjusted position on member 18 by a screw bolt 28 passing through said slot.

In the free ends of brackets 26 is journaled a shaft 29 of an idler roller 31. At the opposite ends of horizontally extending members 18 is journaled a shaft 32 of a roller 33. Fixed to shaft 32 is a gear 34 which meshes with a gear 35 journaled on a shaft 36 mounted on a bracket 37 attached to the framework 17. Also journaled in bracket 37 and in a similar bracket 38 fixed to the framework 17 is a shaft 39 on which is attached a worm gear 41 which meshes with and is driven by a worm 42 mounted on motor shaft 43. At the free end of shaft 43 is carried a gear 44 which meshes with gear 35. Thus, the motor 25 drives the roller 33 and a suitable conveying means such as an endless belt 45 trained over said roller 33 and the idler roller 31. The tension on the endless belt is adjusted to any desired degree by means of the brackets 26. Advantageously, the motor 25 is a constant speed motor which will cause the endless belt to move at a constant linear speed during all phases of its operation.

The construction and weight of the framework and the several elements attached thereto or carried thereby should be such that the whole structure, which is comparable to the lever of a beam scale and which whole structure will hereinafter be referred to as a lever, is in balance about the fulcrum pivots. To maintain the knife edges of the fulcrum pivots in proper position on the flat surfaces of the bearings, there are provided flexure members 46 fixed to integral bosses 47 and 48. These flexure members, which are described and claimed in my copending application, S. No. 80,025, filed March 7, 1949, now Patent No. 2,611,661 each comprise a pair of blocks 49 of any suitable metal such as brass, copper, steel or the like, having fixed between them a web 51 of resilient material, such as natural or synthetic rubber, preferably having a reduced cross-section substantially centrally thereof, as shown.

Although mechanical as well as electrical arrangements may be employed for giving the weight indication of the package being weighed, I prefer to employ electrical means, such as is shown in my copending application, S. No. 126,809, filed November 12, 1949, now Patent No. 2,611,661, for this purpose. This electrical means for indicating the balance of the system, when a package is being weighed, comprises a capacitor, indicated generally by reference numeral 52, electrically connected as shown in said application S. No. 126,809, now Patent No. 2,611,-661, to an indicator 53 which is a microammeter with a central zero. Capacitor 52 comprises two relatively movable plates, an upper plate 54 which is attached to and movable with one of the horizontally extending members 18 of the framework by means of a bracket 55, a disk 56 and springs 57 attached to said disk and the blocks 58 carried by plate 54. The upper plate 54 is supplied with a flange 59, thus forming a cup or short cylinder. The other plate 61 of the capacitor, which is flat and is adapted to be received within the said cup, is supported on a stem 62 fixed to or integral with the base plate 4. This construction of the capacitor gives it an additional function, that of acting as an air dashpot for dampening the oscillations of the system.

For limiting the downward movement of the supporting members of the endless belt, i. e. the framework, etc., there is provided an adjustable stop which comprises a post 63 in which is adjustably carried a screw bolt 64 which acts as the contact member. A locknut 65 is provided to maintain the bolt 64 in adjusted position.

In the operation of my weighing device, the center of gravity of the package, say package 66, as shown, is first determined. The framework 17 is then raised or lowered relative to supporting members 13 to a position where the center of gravity of the package on the endless belt and the fulcrum point of the lever lie in the same horizontal plane. This makes for accuracy of an exceptionally high degree since, if this adjustment were not made, inaccuracies in weighing would be caused by the centrifugal force of the moving package. A reference weight, or weights, equivalent to the desired weight of the package being checked is then placed upon platform 24. The weighing device, connected to a suitable source of electrical power, is now ready to check the weight of the packages supplied thereto on the endless belt thereof.

The package 66 to be tested is placed on the travelling endless belt 45 by hand or automatically from the packaging machine and is moved to the left, as viewed in Fig. 1, until it has reached a predetermined point, which is the point at which the package is in balance with the counterweight, and which point is marked in any suitable manner on the belt supporting means. At this point if the package is of the proper weight the indicator 67 is in line with the zero indication on the chart 68, and if it is lighter or heavier the indicator will be to the right or left of the zero indication, as the case may be. Since the operator may readily observe the relative weight of the package being tested, he is able to pick those which are to be rejected from the belt, permitting the others to pass through to a suitable receptacle, table or conveyor, or, as stated above, means may be provided to pass the packages to several stations depending upon the individual weight of the same, or means may be provided to give a suitable visual or audible signal.

The weighing device of my invention operates quickly and accurately testing a package in as little time as one second within a small fraction of an ounce.

The embodiment of my invention shown and described herein is to be considered merely as illustrative, as my invention is susceptible to variation, modification and change within the spirit and scope of the appended claims.

What I claim as new and desire to secure by Letters Patent is:

1. In a weighing scale, fulcrum stands, supports pivoted on said fulcrum stands, and a lever, having a load receiving portion and a counterweight receiving portion, carried by said supports, said load receiving portion comprising a framework adjustably mounted on said supports and a movable conveyor in said framework for moving the load relative to the pivot point of said lever.

2. In a weighing scale, fulcrum stands, supports pivoted on said fulcrum stands, and a lever, having a load receiving portion and a counterweight receiving portion, carried by said supports, said load receiving portion comprising a framework having one end thereof adjustably mounted on said supports, the other end being free, and a movable conveyor in said framework for moving the load relative to the pivot point of said lever.

3. In a weighing scale, fulcrum stands, supports pivoted on said fulcrum stands, a lever, having a load receiving portion and a counterweight receiving portion, carried by said supports, said load receiving portion comprising a framework having one end thereof adjustably mounted on said supports, the other end being free, a pair of rollers supported in said framework and a movable endless belt trained over said rollers for receiving the load and for moving said load relative to the pivot point of said lever, and means operatively connected to said lever for giving a weight indication of the load on said belt.

4. In a weighing scale, fulcrum stands, supports pivoted on said fulcrum stands, a lever, having a load receiving portion and a counterweight receiving portion, carried by said supports, said load receiving portion comprising a framework having one end thereof adjustably mounted on said supports, the other end being free, a pair of rollers supported in said framework and a movable endless belt trained over said rollers for receiving the load and for moving said load relative to the pivot point of said lever, means, including a motor supported on said counterweight receiving portion and operatively connected to one of said rollers, for driving said belt, and means operatively connected to said lever for giving a weight indication of the load on said belt.

5. In a weighing scale, fulcrum stands, supports pivoted on said fulcrum stands, a lever, having a load receiving portion and a counterweight receiving portion, carried by said supports, said load receiving portion comprising a framework having one end thereof adjustably mounted on said supports, the other end being free, a roller adjustably and rotatably mounted in said framework, a second roller rotatably supported in said framework and having a gear operatively connected thereto, an endless belt trained over said rollers for receiving the load and for moving the load relative to the pivot point of said lever, means, including a motor supported on said counterweight receiving portion and gearing operatively connected to said motor and said gear on said second roller, for driving said belt, and means operatively connected to said lever for giving a weight indication of the load on said belt.

6. In a weighing scale, fulcrum stands, supports pivoted on said fulcrum stands, a lever, having a load receiving portion and a counterweight receiving portion, carried by said supports, said load receiving portion comprising a framework having one end thereof adjustably mounted on said supports, the other end being free, a roller adjustably and rotatably mounted in said framework, a second roller rotatably supported in said framework and having a gear operatively connected thereto, an endless belt trained over said rollers for receiving the load and for moving the load relative to the pivot point of said lever, means, including a motor supported on said counterweight receiving portion and gearing operatively connected to said motor and said gear on said second roller, for driving said belt, and electrical means operatively connected to said lever for giving a weight indication of the load on said belt.

7. In a weighing scale, fulcrum stands, supports pivoted on said fulcrum stands, a lever, having a load receiving portion and a counterweight receiving portion, carried by said supports, said load receiving portion comprising a framework having one end thereof adjustably mounted on said supports, the other end being free, a roller adjustably and rotatably mounted in said framework, a second roller rotatably supported in said framework and having a gear operatively connected thereto, an endless belt trained over said rollers for receiving the load and for moving the load relative to the pivot point of said lever, means, including a motor supported on said counterweight receiving portion and gearing operatively connected to said motor and said gear on said second roller, for driving said belt, and electrical means, including a capacitor operatively connected to the load receiving portion of said lever, for giving a weight indication of the load on said belt.

8. In a weighing scale, fulcrum stands, supports pivoted on said fulcrum stands, a lever, having a load receiving portion and a counterweight receiving portion, carried by said supports, said load receiving portion comprising a framework having one end thereof adjustably mounted on said supports, the other end being free, a roller adjustably and rotatably mounted in said framework, a second roller rotatably supported in said framework and having a gear operatively connected thereto, an endless belt trained over said rollers for receiving the load and for moving the load relative to the pivot point of said lever, means, including a motor supported on said counterweight receiving portion and gearing operatively connected to said motor and said gear on said second roller, for driving said belt, electrical means, including a capacitor operatively connected to the load receiving portion of said lever, for giving a weight indication of the load on said belt, and stop means for limiting the downward movement of said framework.

References Cited in the file of this patent

UNITED STATES PATENTS

| | | |
|---|---|---|
| 719,923 | West | Feb. 3, 1903 |
| 1,584,380 | Krabbendam | May 11, 1926 |
| 1,654,407 | Boulogne | Dec. 27, 1927 |
| 1,751,898 | Uhlig | Mar. 25, 1930 |
| 2,301,177 | Hadley | Nov. 10, 1942 |
| 2,323,023 | Flanagan | June 29, 1943 |
| 2,341,216 | Hem | Feb. 8, 1944 |
| 2,549,908 | Johansen | Apr. 24, 1951 |
| 2,600,966 | Carrier | June 17, 1952 |

FOREIGN PATENTS

| | | |
|---|---|---|
| 270,079 | Great Britain | May 5, 1927 |
| 315,122 | Great Britain | July 11, 1929 |

Disclaimer and Dedication 2,818,245.—*Harlan A. Hadley*, Burlington, Vt. WEIGHING SCALES. Patent dated Dec. 31, 1957. Disclaimer and dedication filed Jan. 2, 1963, by the assignee, *Toledo Scale Corporation*.

Hereby enters this disclaimer and dedication to the public of all claims in said patent.

[*Official Gazette February 19, 1963.*]